United States Patent [19]
Yoshida

[11] Patent Number: 4,823,361
[45] Date of Patent: Apr. 18, 1989

[54] INTERFERENCE IMMUNE DIGITAL MODULATION RECEIVER

[75] Inventor: Yasuharu Yoshida, Tokyo, Japan

[73] Assignee: NEC Corporation, Tokyo, Japan

[21] Appl. No.: 122,970

[22] Filed: Nov. 19, 1987

[30] Foreign Application Priority Data

Nov. 19, 1986 [JP] Japan ............................. 61-277155
Oct. 7, 1987 [JP] Japan ............................. 62-253303
Oct. 9, 1987 [JP] Japan ............................. 62-254893

[51] Int. Cl.$^4$ ............................................. H04B 1/12
[52] U.S. Cl. ..................................... 375/102; 375/39; 455/305
[58] Field of Search ............... 375/12, 14, 15, 39, 375/99, 101, 102; 455/60, 296, 303, 305, 306; 370/20; 342/361, 362

[56] References Cited

U.S. PATENT DOCUMENTS

| | | | |
|---|---|---|---|
| 4,380,082 | 4/1983 | Namiki | 455/305 |
| 4,479,258 | 10/1984 | Namiki | 455/305 |
| 4,534,026 | 8/1985 | Martinez et al. | 375/39 |
| 4,631,734 | 12/1986 | Foschini | 375/15 |
| 4,644,564 | 2/1977 | Dolivo et al. | 375/102 |

*Primary Examiner*—Benedict V. Safourek
*Attorney, Agent, or Firm*—Sughrue, Mion, Zinn, Macpeak & Seas

[57] ABSTRACT

A $2^n$-level demodulated signal is resolved into $2^{(n+m)}$ equal intervals by an (n+m)-bit A/D converter (12) and an (n+m)th significant bit is produced from the LSB output of the converter as a representation of an interfering signal contained in the demodulated signal, where m is equal to or greater than unity. A subtractor (5p, 5q; 32p, 32q) cancels the interfering signal with a cancelling signal supplied from a feedback control circuit (9, 11, 7; 16–19; 30–31) which derives it by controlling the amplitude of the (n+m)th significant bit in accordance with the amount of the interfering signal still present in the output of the subtractor.

24 Claims, 10 Drawing Sheets

| | P1, Q1 | P2, Q2 | E, Pe, Qe |
|---|---|---|---|
| | 1 | 1 | 1 |
| | 1 | 1 | 0 |
| | 1 | 0 | 1 |
| | 1 | 0 | 0 |
| | 0 | 1 | 1 |
| | 0 | 1 | 0 |
| | 0 | 0 | 1 |
| | 0 | 0 | 0 |

INTERFERENCE IMMUNE DIGITAL MODULATION RECEIVER

BACKGROUND OF THE INVENTION

The present invention relates to digital carrier communication systems, and more particularly to a quadrature amplitude modulation (QAM) receiver which is immune to interference.

Multilevel quadrature amplitude modulation techniques have been extensively used in many radio transmission facilities to take advantage of their high transmission efficiency. Implementing a practical system, however, encounters the problem of interference if the system selects a route in a congested environment.

Interference elimination circuitry for a digital radio transmission system is described in U.S. Pat. No. 4,501,004, issued to Y. Yoshida et al, and assigned to the same assignee as the present invention. This elimination circuitry includes a narrow-band filter to detect an interfering signal from the received signal. The detected interfering signal is supplied as a cancelling input to a subtractor for cancelling the intefering signal contained in the desired signal. For complete elimination of the interference, the amplitude and phase of the cancelling signal are controlled respectively in response to feedback signals obtained by a process involving quadrature multiplication between the output of the subtractor and the output of the narrow-band filter. Since the interfering signal is obscured by the desired signal, it is required that the passband of the narrow-band filter be as narrow as possible to improve the carrier-to-noise ratio of the cancelling signal. Although the prior art interference cancelling circuitry is effective for interference if the carrier component of the interfering signal is predominant due to small modulation index as in the case of FM signals, it is impossible to completely eliminate interference if the spectral components of the undesired signal spread over a wide range of frequencies as in the case of FSK and PSK signals.

U.S. Pat. No. 4,553,102 issued to Y. Yoshida and assigned to the same assignee as the present invention discloses DC drift compensation circuitry for digital modulation systems using an analog-to-digital converter for detecting a DC drift component from demodulated signal and applying the output of the A/D converter through a smoothing filter to a subtractor for cancelling the DC drift component.

SUMMARY OF THE INVENTION

It is therefore an object of the present invention to provide a receiver for digital modulation systems which is immune to interfering signals having a wide spread of spectral components.

This object is obtained by the use of an $(n+m)$-bit analog-to-digital converter. This converter resolves a demodulated $2^n$-level signal into $2^{(n+m)}$ equal intervals and generates an $(n+m)$th significant bit as a representation of the interfering signal, where m is equal to or greater than unity. In this way, the full spectral components of the interfering signal can be obtained with a high carrier-to-noise ratio.

According to a broader aspect of the present invention, there is provided a digital modulation receiver which comprises a demodulator for demodulating a received digitally modulated signal to produce a $2^n$-level signal, a subtractor for cancelling an interfering signal contained in the $2^n$-level signal with a cancelling signal, and an interference detector for extracting the interfering signal from the output of the demodulator. The interference detector comprises a $(n+m)$-bit analog-to-digital converter for resolving the output of demodulator into $2^{(n+m)}$ equal intervals and generates $(n+m)$th significant error bits, where m is equal to or greater than unity. A feedback control circuit is provided for controlling the amplitude of the $(n+m)$th bit of the A/D converter in accordance with the amount of the interfering signal contained in the output of the subtractor and applying the controlled bit to the subtractor as the cancelling signal.

According to a specific aspect, the present invention provides a quadrature amplitude modulation (QAM) receiver comprising a QAM demodulator for demodulating a received $(2^n \times 2^n)$ QAM signal into first and second $2^n$-level demodulated signals, where n is equal to or greater than unity, and first and second data recovery circuits associated respectively with the first and second demodulated signals. Each of the data recovery circuits comprises a subtractor for cancelling an interfering signal contained in the associated demodulated signal with a cancelling signal, and an interference detector for extracting the interfering signal from one of the demodulated signals. The interference detector comprises an $(n+m)$-bit analog-to-digital converter for resolving one of the demodulated signals into $2^{(n+m)}$ equal intervals and generates an $(n+m)$th significant bit. A feedback control circuit controls the $(n+m)$th significant bit in accordance with the interfering signal contained in the output of the subtractor and applies it to the subtractor as the cancelling signal.

Preferably, the carrier-to-noise ratio of the cancelling signal is improved by passing the output of the first analog-to-digital converter through a band-pass filter having a passband equal to the bandwidth of the interfering signal.

In one embodiment of the present invention, the feedback control circuit comprises a second $(n+m)$-bit analog-to-digital converter for converting the output of the subtractor into most to n-th significant information bits and an $(n+1)$th significant error bit. A multiplier is provided for multiplying the $(n+1)$th significant error bit of the output of the first analog-to-digital converter by the $(n+1)$th significant bit of the output of the second analog-to-digital converter. The output of the multiplier is used to control the amplitude of the $(n+1)$th significant bit of the output of the first analog-to-digital converter.

Alternatively, the feedback control circuit is formed by a second $(n+m)$-bit analog-to-digital converter for converting the output of the subtractor into most to n-th significant information bits and a $(n+1)$th significant error bit. A first quadrature multiplier multiplies the binary signal of the $(n+1)$th significant error bit of the output of the first analog-to-digital converter by the $(n+1)$th significant bit of the output of the second analog-to-digital converter in a quadrature relationship to produce I and Q outputs, which are respectively smoothed and applied to a second quadrature multiplier. The second quadrature multiplier multiplies the $(n+1)$th significant error bit of the output of the first analog-to-digital converter by the smoothed I and Q signals in a quadrature relationship to derive the cancelling signal.

In a modified embodiment, an $(n+m)$-bit subtractor is arranged to subtract the cancelling signal from the (n+m)-bit output of the first analog-to-digital converter. The feedback control circuit comprises a correlator for detecting a correlation between the (n+1)th to (n+m)th significant bits of the output of the subtractor and the the (n+1)th to (n+m)th significant bits of the output of the first analog-to-digital converter. The (n+1)th to (n+m)th significant bits of the output of the first analog-to-digital converter are multiplied by the output of the correlator and applied to the subtractor as the cancelling signal.

BRIEF DESCRIPTION OF THE DRAWINGS

The present invention will be described in further detail with reference to the accompanying drawings, in which.

DETAILED DESCRIPTION

Figure 1:
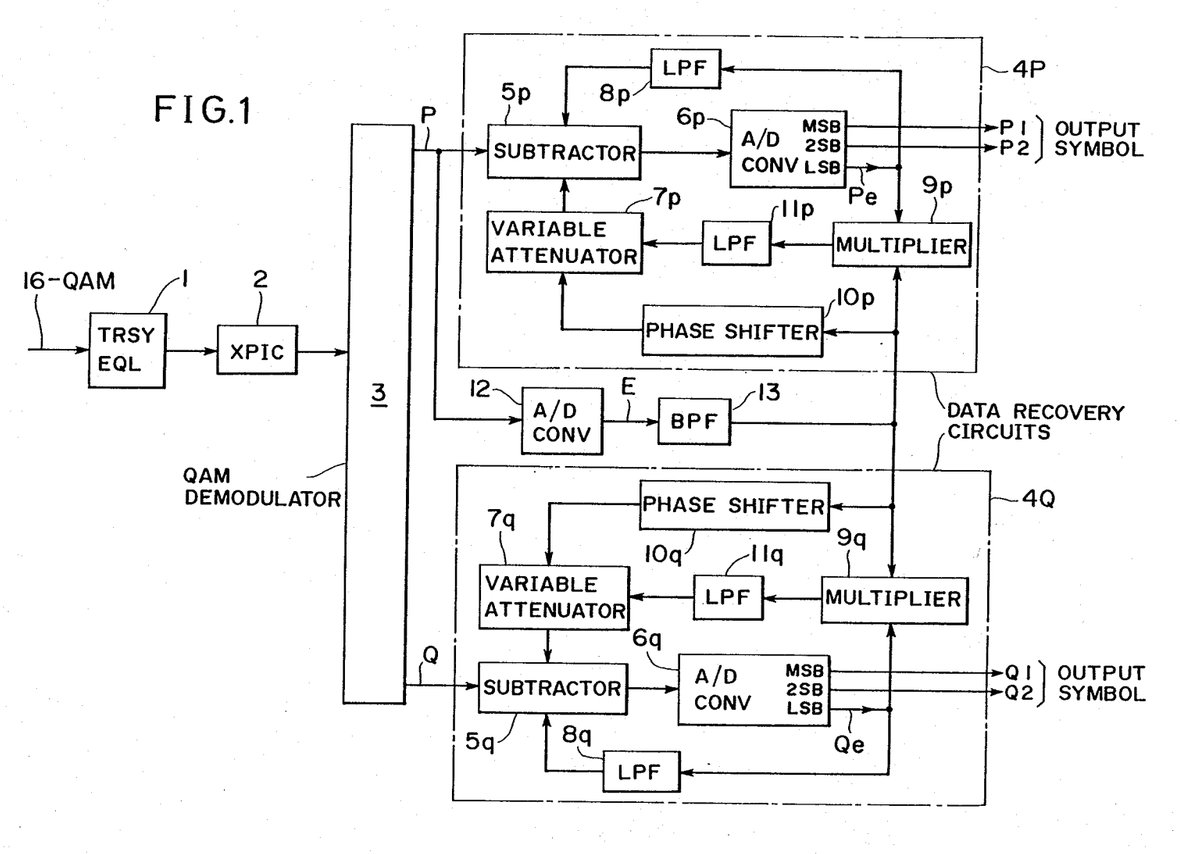
FIG. 1 is a block diagram of a 16-quadrature amplitude modulation receiver according to a first embodiment of the invention.

Referring to FIG. 1, there is shown a receiving apparatus for a quadrature amplitude modulation (QAM) system according to a first embodiment of the invention. A received 16-QAM baseband signal is applied to a transversal equalizer 1 to cancel undesired components caused by interference between adjacent symbols of the same polarization plane. The output of equalizer 1 is applied to a cross polarization interference canceller 2 where undesired components introduced by interference with different polarization planes are cancelled. With these preconditioning processes, the waveform distortion of the input 16-QAM signal is removed advantageously for succeeding stages that comprise a QAM demodulator 3 and a pair of identically constructed data recovery circuits 4P and 4Q. QAM demodulator 3 is of a known construction which essentially comprises a pair of in-phase and quadrature mixers, a 90-degree phase shifter and a voltage-controlled oscillator that supplies a replica of the original carrier directly to the in-phase mixer and through the phase shifter to the quadrature mixer. A demodulated in-phase 4-level output P is derived from the in-phase mixer of demodulator 3 and applied to the data recovery circuit 4P and a demodulated 4-level quadrature output Q is derived from the quadrature mixer of the demodulator and applied to the data recovery circuit 4Q.

Each of the data recovery circuits 4 is constructed of a subtractor 5 and a 3-bit analog-to-digital converter 6 which is a quarternary-to-binary converter for converting the associated 4-level demodulated output into a binary signal. A/D converter 6 has three digital outputs designated most-significant bit (MSB), second significant bit (2SB) and a least significant bit (LSB). Main digital signals P1 and P2 are recovered from the MSB and 2SB outputs. Subtractor 5 receives the in-phase demodulated output P from the demodulator 3 and a cancelling signal from a variable attenuator 7 to cancel the undesired signal introduced by interference with other digital radio transmission systems. An error component Pe or Qe which still exists after this cancelling process appears at the LSB output of the A/D converter 6. Subtractor 5 further receives a DC-drift cancelling signal from the LSB output through a low-pass filter 8.

One of the outputs of demodulator 3, the P output, for example, is applied to a 3-bit A/D converter 12 for detecting an undesired component E caused by interference with other transmission systems and applies its output through a band-pass filter 13 to multipliers $9p$ and $9q$ and phase shifters $10p$ and $10q$ of the respective data recovery circuits to detect the amount of interference still present in the output of A/D converter 6. A/D converter 12 resolves the applied 4-level input into $2^3$ equal intervals and generates an LSB output which corresponds to the LSB output of each of the A/D converters $6p$ and $6q$. In this way, the full spectrum components of the interfering signal with a high carrier-to-noise ratio can be obtained from the LSB output of A/D converter 12 and are used as an excellent source for deriving a cancelling signal with a high signal-to-noise ratio.

With the use of transversal equalizer 1 and cross polarization interference canceller 2, the carrier-to-noise ratio of the output of A/D converter 12 is further improved.

Multiplier 9 provides multiplication between the output of band-pass filter 13 and the error component e (=Pe or Qe) and supplies its output through a low-pass filter 11 to the control terminal of variable attenuator 7 as a representation of the amount of the interfering signal still present in the output of the A/D converter 6. The output of phase shifter 10 is applied to variable attenuator 7 and the amplitude of the phase-shifted interfering signal from the A/D converter 12 is controlled in accordance with the residual interfering signal. The output of the variable attenuator 7 is applied as a cancelling signal to the subtractor 5.

Figure 2:
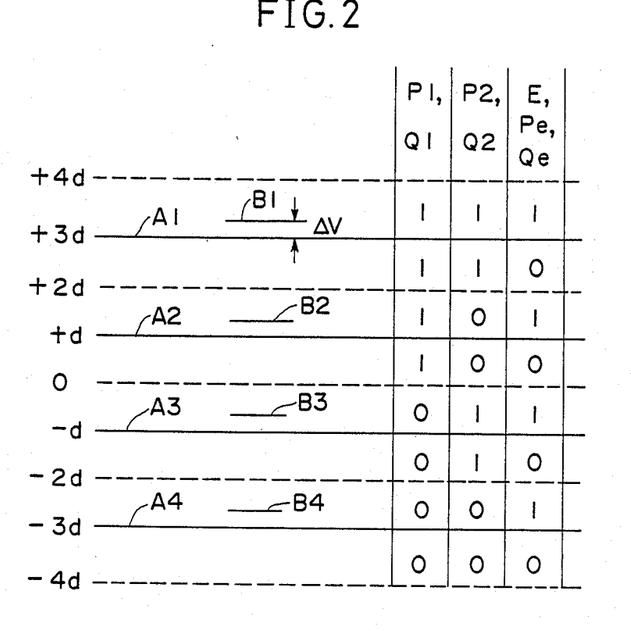
FIG. 2 is a view illustrating reference thresholds for binary decision taken by the A/D converters of FIG. 1.

As shown in FIG. 2, the 4-level input to each of the A/D converters $6p$, $6q$ and 12 is divided into eight ranges of equal intervals d and four reference levels A1 through A4 are defined corresponding to levels $+3d$, $+d$, $-d$ and $-3d$, respectively. The P1 and Q1 outputs of A/D converters $6p$ and $6q$ are at logic 1 when higher than 0 and at logic 0 when it is lower than 0. The P2 and Q2 outputs are at logic 1 when the input falls in the range between $+2d$ and $+4d$ or falls in the range between 0 and $-2d$ and at logic 0 when it falls in the range between $-2d$ and $-4d$ or falls in the range between 0 and $+2d$. The outputs Pe, Qe and E of all the A/D converters $6p$, $6q$ and 12 are at logic 1 when the input falls in the range between $+3d$ and $+4d$, between $+d$ and $+2d$, between 0 and $-d$ or between $-2d$ and $-3d$ and at logic 0 when it falls in the other ranges. If the amplitude of the interfering signal introduced to the 16-QAM input is $+\Delta V$, the amplitude of the 4-level demodulated outputs P and Q will deviate by an amount $\Delta V$ on the positive side of the reference levels A1 through A4 and assume levels B1 through B4 as indicated in FIG. 2. The deviation of the input signal as such will result in the generation of a logical-1 error voltage E from the A/D converter 12 and this error voltage is interpreted as representing the interference caused by other transmission systems. The logic level of the LSB output of A/D converters 6p and 6q varies in a manner similar to the output of A/D converter 12. It is to be noted that with the use of A/D converter 12 the QAM component of the desired signal is completely eliminated from the output of the A/D converter 12. The output of A/D converter 12 is therefore a representation of an interfering signal having a high carrier-to-noise ratio.

The purpose of band-pass filter 13 is to eliminate undesired jitter components introduced to the interfering signal to further improve its carrier-to-noise ratio. Band-pass filter 13 is preferably constructed of a phase-locked loop having a loop filter the bandwidth of which is adjusted to be equal to the bandwidth of the interfering signal. As a result, the full bandwidth of the interfering signal can be detected from band-pass filter 13, and this detected signal can be used as an excellent interference cancelling signal. The function of the phase shifter 10 is to adjust the phase of the cancelling signal so that it is time coincident with the interfering signal contained in the demodulated signal at the subtractor 5.

Multiplier 9 produces a positive voltage output when both of its inputs are at logic 1 or logic 0 and produces a negative output voltage when one of its inputs is at logic 1 and the other is at logic 0. The output of multiplier 9 is filtered into a DC control voltage by low-pass filter 11. In response to a positive DC voltage from low-pass filter 11, variable attenuator 7 is adjusted to a low setting and in response to a negative DC voltage from low-pass filter 11, the attenuator is adjusted to a high setting.

If the LSB output of A/D converter 6 is initially at logic 0. Multiplier 9 supplies a negative voltage to variable attenuator 7 so that it is adjusted to the high setting. The cancelling signal from the band-pass filter 13 is attenuated to a level much lower than is necessary to cancel the interfering signal at the subtractor 5. As a result, the input of A/D converter 6 deviates on the positive side of the reference levels A1 through A4, and hence it produces a logic 1 at the LSB output. Multiplier 9 then supplies a positive output through low-pass filter 11 to the control input of variable attenuator 7 to adjust its setting to a low value. This results in an increase in the cancelling signal at the output of attenuator 7. If the attenuator setting is driven to a level lower than is necessary, the LSB output becomes logic 0, producing a negative voltage output from the multiplier 9 to change the attenuator setting in the opposite direction. The above process will be repeated to cancel the positive interfering signal. In the same manner, the introduction of a negative interfering signal to the demodulated signal will cause the A/D converter 12 to produce a logic-0 output. Multiplier 9 generates a negative voltage output if the LSB output is at logic 1 to adjust the setting of variable attenuator 7 to a high value, or a positive voltage output if the LSB output is at logic 0 to adjust the attenuator setting to a low value.

In this way, the level of input signals to A/D converters 6p and 6q is adjusted at optimum setting with respect to the reference levels A1 through A4, thus reducing the rate of error occurrences in the digital outputs P1, P2, Q1 and Q2.

Since the cancelling signal can be derived from the full bandwidth of the interfering signal, all the spectrall components of the interfering components can be completely cancelled.

The application of the LSB output through low-pass filter 8 to the subtractor 5 is to cancel the DC-drift component introduced to the input of the A/D converters 6p and 6q as a result of the receiver's manufacturing tolerances or variability. If the DC drift is on the positive side of the reference levels, the LSB output is at logic 1, and if negative, it switches to logic 0. The output of low-pass filter 8 shifts the input level in a direction opposite to the direction of the DC drift.

Since the demodulated signals P and Q have a strong correlation to each other with respect to interference, the A/D converter 12 can alternatively be connected to the output of the demodulated signal Q.

Figure 3:
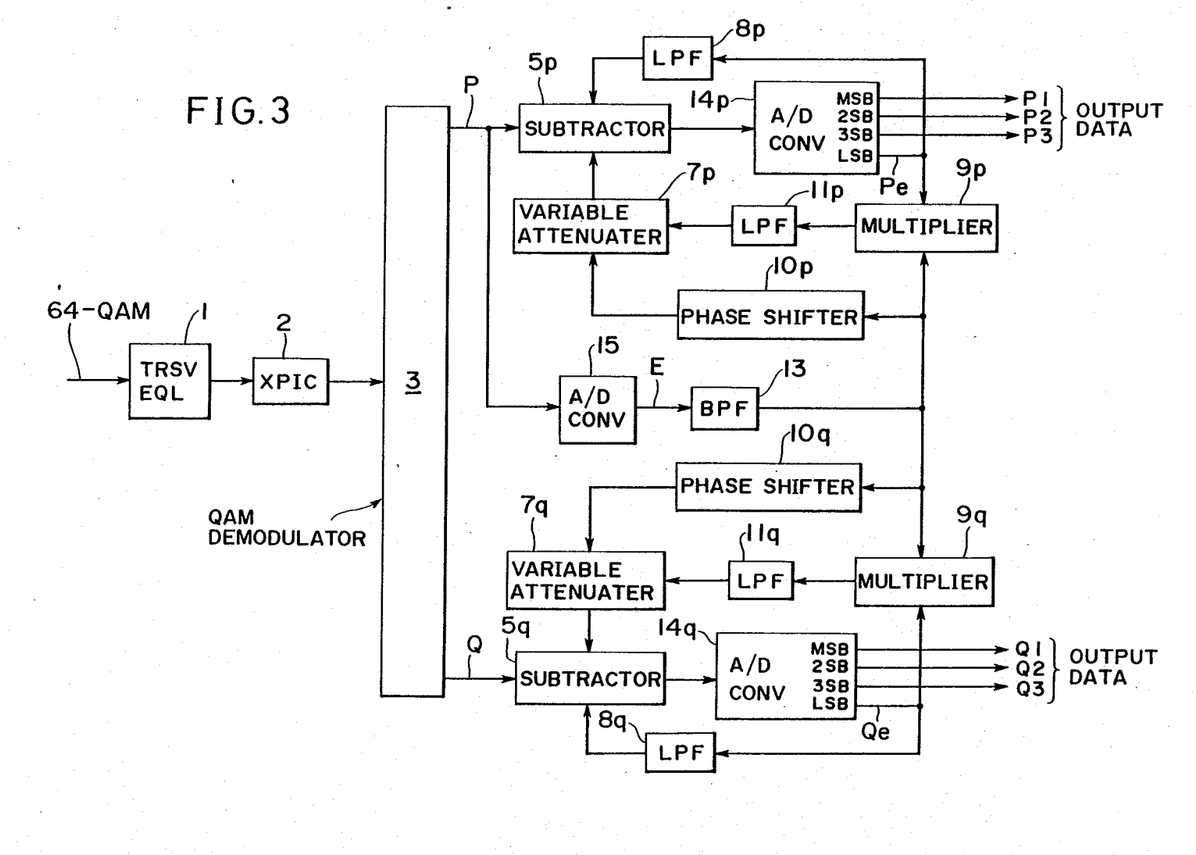
FIG. 3 is a block diagram of a 64-QAM receiver according to a modified embodiment of the invention.

The interference cancelling technique as taught by the present invention could equally be as well employed in other multilevel signals such as 8-PSK and 64-QAM signals. In the case of 8-PSK detection in which the signal points are not equally spaced apart from each other, the reference levels of each A/D converter are adjusted to correspond respectively to the unequally spaced signal points. In the case of 64-QAM detection, the A/D converters 6p, 6q and 12 of FIG. 1 are replaced with A/D converters 14p, 14q and 15, respectively, as shown in FIG. 3. The QAM demodulator 3 generates 8-level demodulated signals P and Q, and the input of A/D converters 14p, 14q and 15 is divided into 16 ranges of equal intervals and 8 reference levels are defined. Each of A/D converters 14p and 14q has MSB, 2SB, 3SB and LSB outputs to derive 3-bit parallel outputs P1 to P3 and Q1 to Q3. The output of A/D converter 15 corresponds to the LSB output of analog-digital converters 14p and 14q as in the previous embodiment. Therefore, when there is an amplitude deviation exceeding beyond $\frac{1}{8}$ of the total input range, A/D converters 14p and 14q changes their logic state at the LSB output and A/D converter 15 changes the logic state of its sole output as an indication of interference error.

Figure 4:
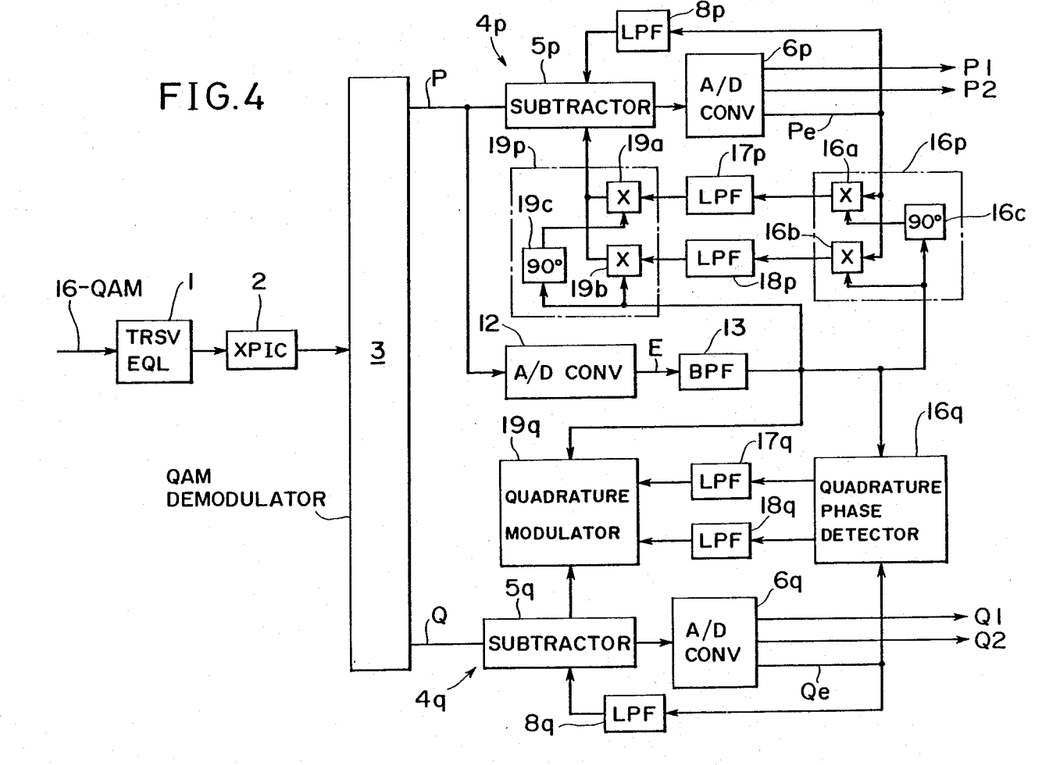
FIG. 4 is a block diagram of a 16-QAM receiver according to a further modification of the invention.

The embodiment of FIG. 1 can be modified as shown in FIG. 4. in which same reference numerals are used to designate parts corresponding to those in FIG. 1. The LSB output of A/D converter 6 is applied to the first input of a quadrature phase detector 16 and the output of band-pass filter 13 is applied to the second input of the quadrature phase detector 16. Quadrature phase detector 16 comprises a pair of mixers or multipliers 16a and 16b. The LSB output of A/D converter 6 is supplied to the first inputs of multipliers 16a and 16b and the output of band-pass filter 13 is applied to the second inputs of the multipliers in a quadrature relationship using a $\pi/2$ phase shifter 16c. In-phase and quadrature outputs are respectively supplied from the multipliers 16a and 16b through smoothing low-pass filters 17 and 18 to a quadrature modulator 19 in order to control the amplitude and phase of the output of band-pass filter 13. Quadrature modulator 19 is formed by a pair of multipliers 19a and 19b to which the outputs of low-pass filters 17 and 18 are applied. The band-pass filter output is fed to the multipliers 19a and 19b in a quadrature relationship using a $\pi/2$ phase shifter 19c. The outputs of multipliers 19a and 19b are combined together to produce a cancelling signal which is supplied to the subtractor 5. In this way, the cancelling signal has the same amplitude and phase as the interfering signal introduced to the 4-level demodulated signal for DC drift compensation. Thus, the phase deviation of the cancelling signal from the interfering signal is automatically cancelled as well as the amplitude deviation, providing immunity to both amplitude and phase variations due to temperature and ageing effects.

Figure 5:
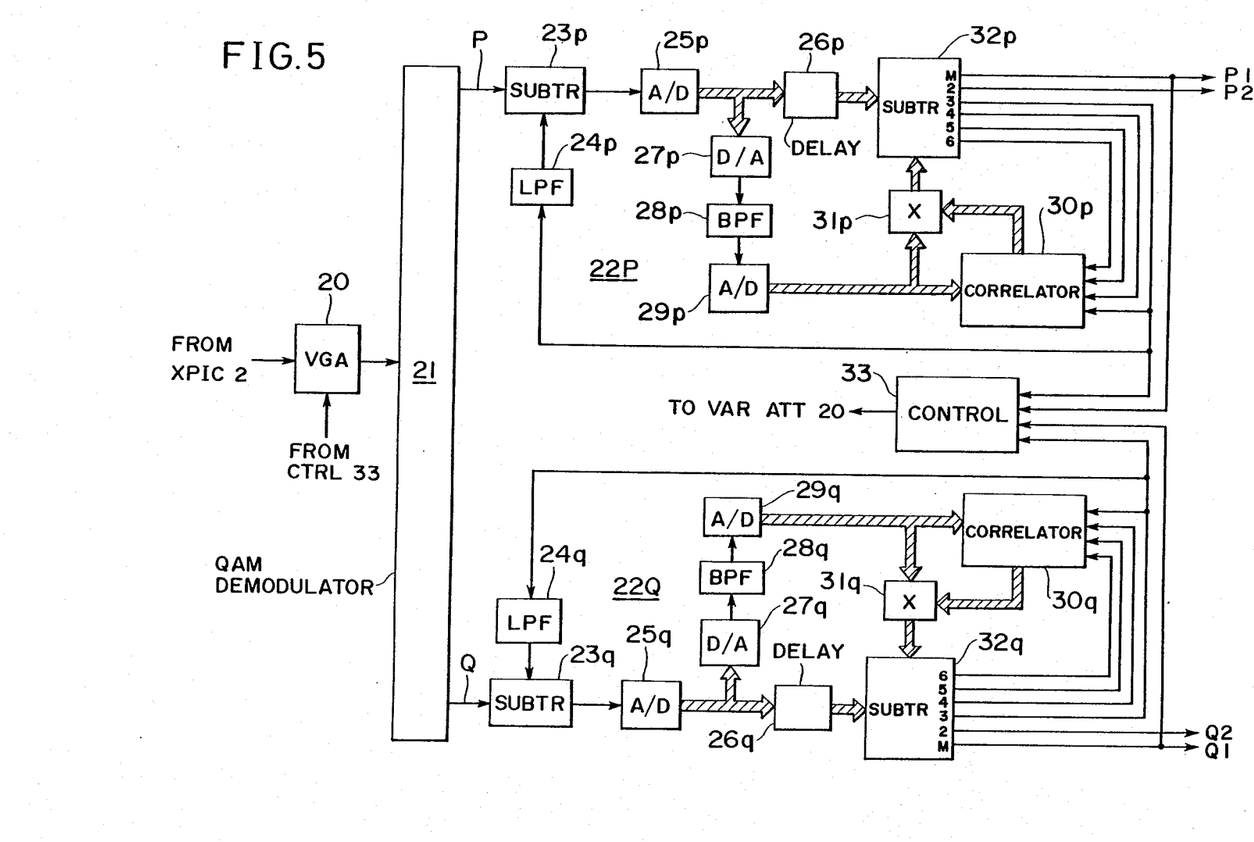
FIG. 5 is a block diagram of a 16-QAM receiver according to a ;second embodiment of the invention.

A second embodiment of the present invention for 16-QAM detection is shown in FIG. 5. The output of cross polarization interference canceller 2 is applied through a variable gain amplifier 20 to the input of a QAM demodulator 21 to produce 4-level signals P and Q for application to data recovery circuits 22P and 22Q of identical circuit configuration. As in the FIG. 1 embodiment, each data recovery circuit comprises a subtractor 23 which subtracts the output of a low-pass filter 24 from the four-level signal. The output of subtractor 23 is applied to an A/D converter 25. The input of A/D converter 25 is equally divided into 64 ($=2^6$) ranges. A/D converter 25 generates 6-bit parallel outputs which are applied to a delay circuit 26. The third to sixth significant bits of A/D converter 25 are applied to a 4-bit digital-to-analog converter 27. These four-bit parallel inputs indicate the amount and direction of deviation of the four-level signal from the reference levels A1 through A4 (FIG. 2), and can be interpreted as precisely representing the interference component. D/A converter 27, which forms part of an inteference detector, converts the input data bits into a corresponding analog signal, which is passed through a noise-eliminating band-pass filter 28 to a 4-bit A/D converter 29. The 3-bit output of A/D converter 29 can alternatively be derived by supplying the third significant bit of the outputs of A/D converter 25 directly to the band-pass filter 28, thus dispensing with the D/A converter 27. Although the cancelling signal may suffer signal-to-noise ratio degradation, it can be tolerated for applications where high degree of precision is not required for inteference cancellation. If the bandwidth of the interfering signal is narrow, band-pass filter 28 is preferably a tracking filter having a phase-locked loop. The output of A/D converter 29 is supplied to a digital correlator 30 and to a digital multiplier 31. On the other hand, the 6-bit outputs from A/D converter 25 are delayed by delay circuit 26 so that they coincide in time with digital outputs of multiplier 31. The delayed outputs are supplied to a 6-bit subtractor 32 where they are combined with a cancelling signal supplied from the multiplier 31. The MSB and 2SB outputs of subtractor 32 provide the output symbol and the fourth to sixth significant bit outputs are supplied to the correlator 30.

Digital correlator 30 essentially comprises a digital multiplier and a digital integrator. The 4-bit outputs from A/D converter 29 represent the third to sixth significant bits of the demodulated signal. These 4 bits are multiplied by the 4-bit inputs (corresponding to third to sixth significant bits) of the output of from subtractor 32 and a time integral of the digital products is supplied to subtractor 32 as a representation of the cross-correlation between the residual interference component in the outputs of subtractor 32 and the cancelling signal. Depending on the amount of the residue, a correlation signal is supplied from correlator 30 to multiplier 31 as a weighting factor to control the magnitude of the 3-bit cancelling signal from A/D converter 29. Multiplier 31 generates an output having a magnitude equal to but opposite in polarity to the interference signal contained in the delayed outputs, so that it cancels the latter signal in the subtractor 32.

The third significant bit of the outputs of subtractor 32 is smoothed by low-pass filter 24 and fed to subtractor 23 to cancel the DC-drift component.

The MSB and 3SB outputs of subtractors 32p and 32q are applied to a controller 33. This controller generates logic-1 and logic-0 control signals respectively corresponding to the logic 1 and logic 0 of the third significant bit when the MSB is at logic 1 and generates logic-1 and logic-0 control signals respectively corresponding to the logic 0 and logic 1 of the third significant bit when the MSB is at logic 0. In this way, the logic state of the control signal is made symmetrical with respect to zero voltage level. The output of controller 33 is applied to control the gain of the variable gain amplifier 20 so that the amplitude of the received 16-QAM signal is automatically controlled to a desired level.

Figure 6:
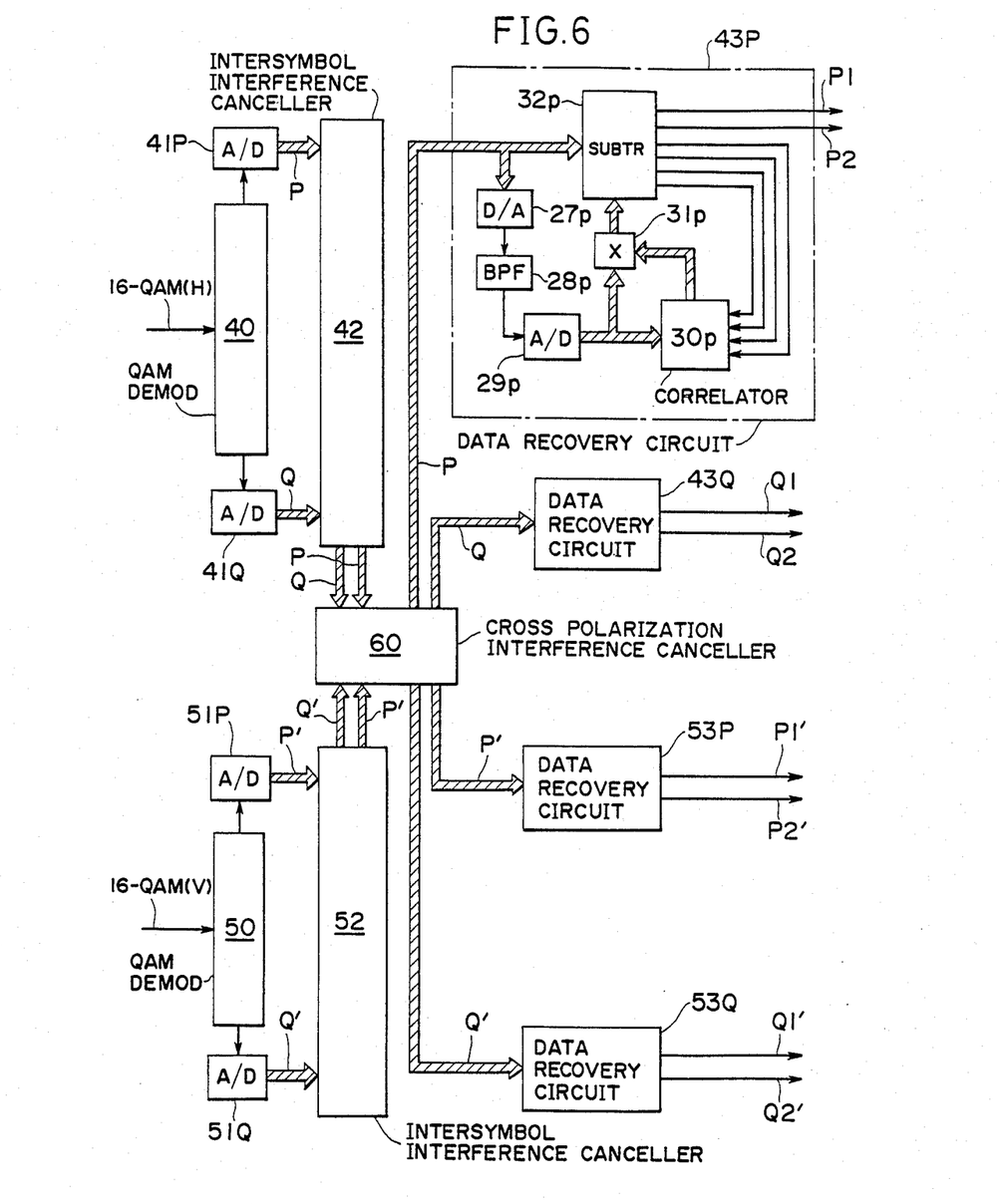
FIG. 6 is a block diagram of 16-QAM receiver according to a third embodiment of the invention in which it receives signals transmitted on horizontal and vertical polarization planes, the embodiment including cancellation circuits for cancelling intersymbol interference and cross polarization interference which are coupled in a series configuration.

FIG. 6 is an illustration of a third embodiment of the present invention. This embodiment is a pair of 16-QAM detection systems for receiving signals on horizontal and vertical polarization planes, and includes a horizontal intersymbol interference canceller 42, a vertical intersymbol interference canceller 52 and a cross polarization interference canceller 60. A 16-QAM IF signal transmitted on the horizontal plane is applied to a quadrature demodulator 40. The demodulated quadrature signals are applied respectively to 6-bit A/D converters 41P and 41Q. The horizontal intersymbol interference canceller 42 receives the 6-bit digital outputs of A/D converters 41P and 41Q. Likewise, a 16-QAM IF signal sent on the vertical plane is applied to a quadrature demodulator 50, the quadrature outputs being respectively applied to 6-bit A/D converters 51P and 51Q. The vertical intersymbol interference canceller 52 receives the 6-bit digital outputs of A/D converters 51P and 51Q. Intersymbol interference that occurs between successive symbols of the same polarization plane is cancelled in each of the intersymbol interference cancellers and their outputs are applied to respective inputs of the cross polarization interference canceller 60. Cross polarization interference between the horizontal and vertical planes is eliminated by the canceller 60 and its outputs are supplied respectively to a pair of in-phase and quadrature data recovery circuits 43P and 43Q of the horizontal-plane detection circuitry and to a pair of in-phase and quadrature data recovery circuits 53P and 53Q of the vertical-plane detection circuitry. Each of the data recovery circuits 43P, 43Q, 53P and 53Q is constructed in a manner similar to the data recovery circuits 22P and 22Q of FIG. 5. In this embodiment, the intersymbol interference cancellers 42 and 52 are connected in series with the cross polarization interference canceller 60.

Figure 7:
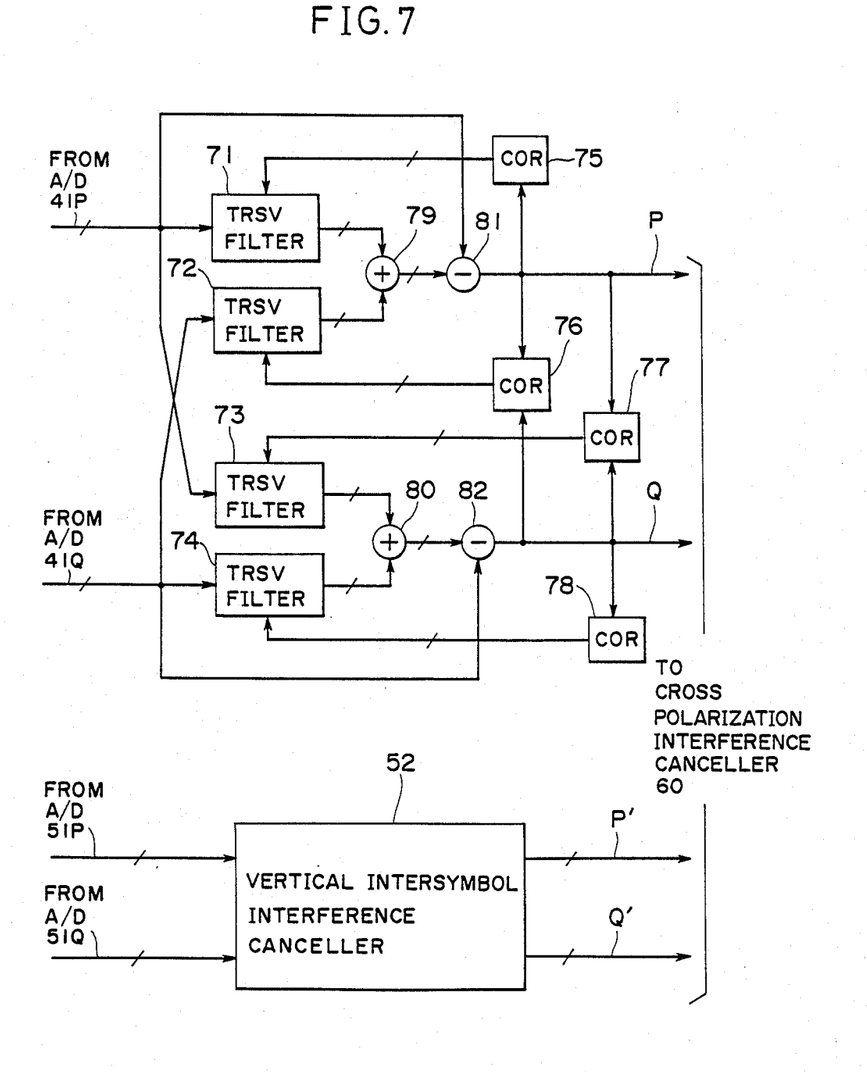
FIG. 7 is a block diagram of the intersymbol interference cancellers of FIG. 6.
Figure 8:
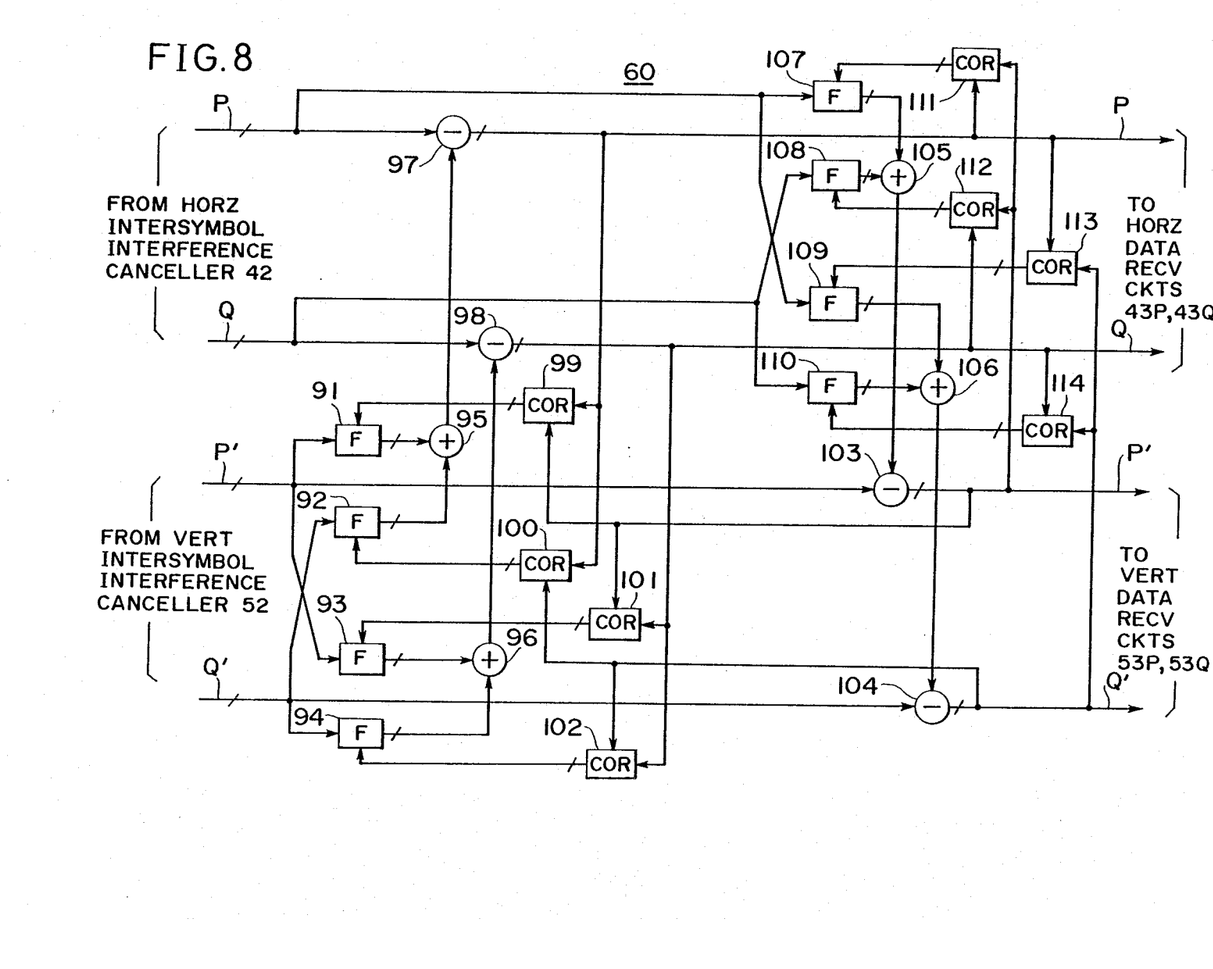
FIG. 8 is a block diagram of the cross polarization interference canceller of FIG. 6.

Details of the intersymbol interference cancellers 42 and 52 and of the cross polarization interference canceller 60 are shown in FIGS. 7 and 8, respectively. In FIG. 7, each of the intersymbol interference cancellers 42 and 52 is of identical construction comprising digital transversal filters 71 through 74, correlators 75 through 78, adders 79 and 80, and subtractors 81 and 82. Transversal filters 71 through 74 of each canceller have their inputs cross-coupled so that the inputs of the filters 71 and 73 are connected together to the output of A/D converter 41P or 51P and the inputs of the filters 72 and 74 are connected together to the output of A/D converter 41Q or 51Q. The outputs of transversal filters 71 and 72 are connected to adder 79 and the outputs of transversal filters 73 and 74 are connected to adder 80. Correlator 75 has a sole input connected to the output of subtractor 81 to supply a signal to the tap control terminal of transversal filter 71 indicating the auto-correlation between the signals on the in-phase channel. Similarly, correlator 78 has a sole input connected to the output of subtractor 82 to supply a signal to the tap control terminal of transversal filter 74 indicating the auto-correlation between the signals on the quadrature channel. The difference between the output of adder 79 and the in-phase input is taken by the subtractor 81 and fed to an in-phase input of cross polarization interference canceller 60. Correlator 72 is connected between the outputs of subtractors 81 and 82 and supplies a signal to the tap control terminal of transversal filter 72 indicating the cross-correlation between the in-phase and quadrature channels. Likewise, the difference between the output of adder 80 and the quadrature input is taken by the subtractor 82 and fed to a quadrature input of cross polarization interference canceller 60. Correlator 77 is connected across the subtractors 81 and 82 and supplies a control signal to the transversal filter 73 indicating the cross-correlation between the in-phase and quadrature channels.

Referring to FIG. 8, the cross polarization interference canceller 60 comprises a set of digital transversal filters 91 through 94 having their inputs cross-coupled to the inputs from the vertical intersymbol interference canceller 52, the outputs of filters 91 and 92 being coupled to an adder 95 and the outputs of filters 93 and 94 being coupled to an adder 96. The outputs of adders 95 and 96 are connected respectively to subtractors 97 and 98 to subtract from the outputs of horizontal intersymbol interference canceller 42. Tap control signals of the filters 91 through 94 are derived from the outputs of correlators 99 through 102. Correlators 99 and 100 have first inputs coupled together to the output of subtractor 97 and second inputs respectively coupled to the outputs of subtractors 103 and 104 which take inputs from the outputs of vertical intersymbol interference canceller 52 and the outputs of adders 105 and 106. Correlators 101 and 102 have first inputs coupled together to the output of subtractor 98 and second inputs respectively coupled to the outputs of the subtractors 103 and 104. To provide a symmetrical configuration, the cross polarization interference canceller 60 further includes digital transversal filters 107 through 110 having their inputs cross-coupled to the inputs from the horizontal intersymbol interference canceller 42, the outputs of filters 107 and 108 being coupled to the adder 105 and the outputs of filters 109 and 110 being coupled to the adder 106. Tap control signals of the filters 107 through 110 are derived from the outputs of correlators 111 through 114. Correlators 111 and 112 have first inputs coupled together to the output of subtractor 103 and second inputs respectively coupled to the outputs of the subtractors 97 and 98. Correlators 113 and 114 have first inputs coupled together to the output of subtractor 104 and second inputs respectively coupled to the outputs of the subtractors 97 and 98.

With the above described configuration, the transversal filters 91 and 107 are controlled in response to the cross-correlation between the in-phase channel of horizontal intersymbol interference canceller 42 and the in-phase channel of vertical intersymbol interference canceller 52. Transversal filters 92 and 108 are controlled in response to the cross-correlation between the in-phase channel of horizontal intersymbol interference canceller 42 and the quadrature channel of vertical intersymbol interference canceller 52. Likewise, transversal filters 93 and 109 are controlled in response to the cross-correlation between the quadrature channel of horizontal intersymbol interference canceller 42 and the in-phase channel of vertical intersymbol interference canceller 52, and transversal filters 94 and 110 are controlled in response to the cross-correlation between the quadrature channel of horizontal intersymbol interference canceller 42 and the quadrature channel of vertical intersymbol interference canceller 52. The vertical-to-horizontal cross-polarization interference components are therefore summed in the adders 95 and 96 and supplied to subtractors 97 and 98 to cancel the corresponding interference components introduced to the outputs of horizontal intersymbol interference canceller 42. The horizontal-to-vertical cross polarization interference components are summed in the adders 105 and 106 and supplied to subtractors 103 and 104 to cancel the corresponding interference components introduced to the outputs of vertical intersymbol interference canceller 52. The outputs of subtractors 97 and 98 are supplied to the horizontal data recovery circuits 43P and 43Q, respectively, and the outputs of subtractors 103 and 104 are supplied to the vertical data recovery circuits 53P and 53Q, respectively.

Each of the data recovery circuits 43P, 43Q, 53P and 53Q cancels the interference component that has been introduced to each channel from other transmission systems in a manner identical to that described with reference to FIG. 5.

Figure 9:
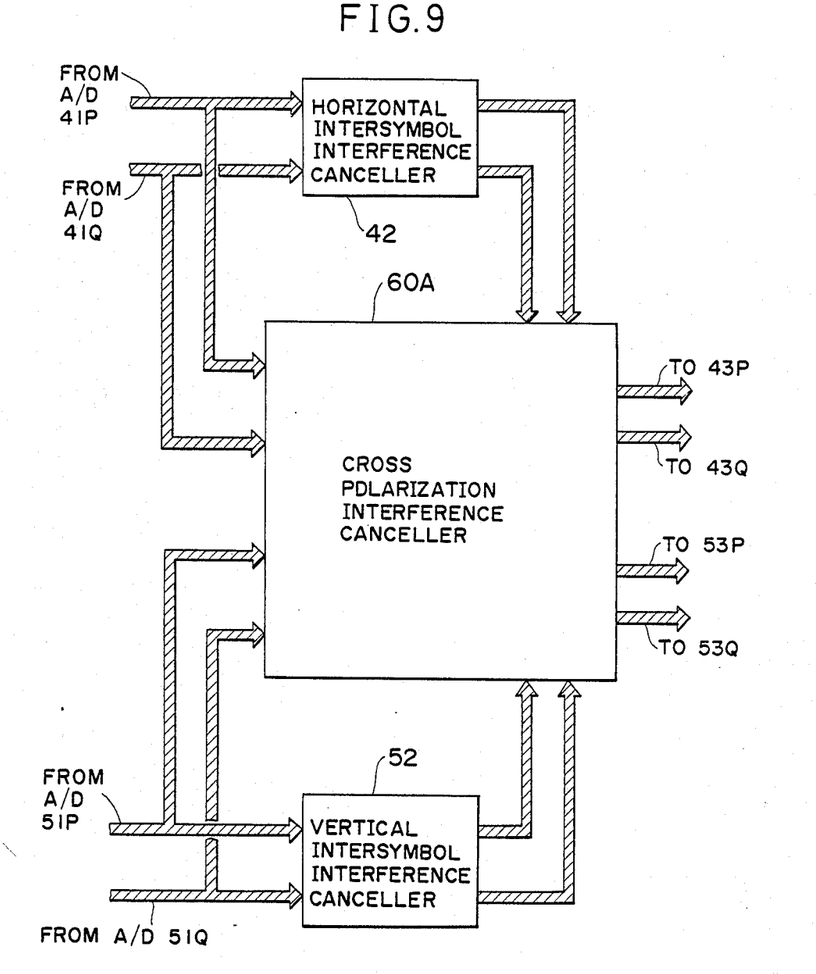
FIG. 9 is a block diagram of a modification of the FIG. 6 embodiment.
Figure 10:
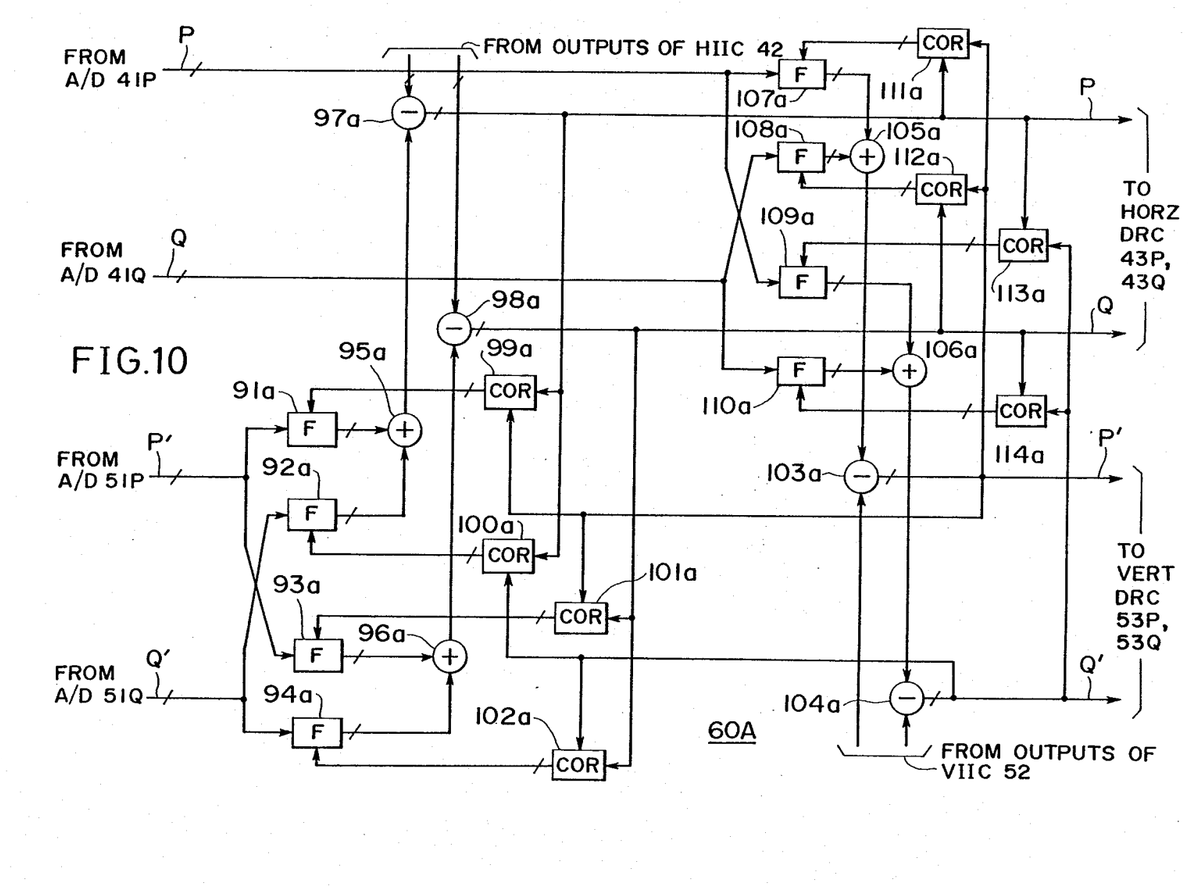
FIG. 10 is a block diagram illustrating the detail of the cross polarization interference canceller of FIG. 9.

FIG. 9 is a schematic illustration of an alternative embodiment of the invention in which the horizontal and vertical intersymbol interference cancellers 42 and 52 are connected in a parallel configuration with a cross polarization interference canceller 60A which is a slightly modified version of the cross polarization interference canceller 60 as shown in FIG. 10. The outputs from A/D converters 41P and 41Q are supplied to transversal filters 107a through 110a as well as to the inputs of horizontal intersymbol interference canceller 42 and the outputs from A/D converters 51P and 51Q are supplied to transversal filters 91a through 94a as well as to the inputs of vertical intersymbol interference canceller 52. The outputs of horizontal intersymbol interference canceller 42 are supplied to the subtractors 97a and 98a and the outputs of vertical intersymbol interference canceller 52 are supplied to the subtractors 103a and 104a.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A receiver for a digital modulation system, comprising:
 a demodulator for demodulating a received digitally modulated signal to produce a $2^n$-level signal;
 a subtractor for cancelling an interfering signal contained in said $2^n$-level signal with cancelling signal;
 a first (n+m)-bit analog-to-digital converter for resolving the amplitude of the $2^n$-level signal into $2^{(n+m)}$ equal intervals and generating an (n+m)-th significant bit as a replica of said interfering signal, where m is equal to or greater than unity;

a second (n+m)-bit analog-to-digital converter for resolving the amplitude of an output signal from said subtractor into $2^{(n+m)}$ equal intervals and generating n higher significant bits modulator output signal and an (n+m)-th lower significant bit as an error signal; and a feedback control circuit for controlling the amplitude of said replica of said interfering signal in accordance with said error signal and supplying the controlled replica of said interfering signal to said subtractor as said cancelling signal.

2. A receiver as claimed in claim 1, wherein said feedback control circuit comprises:

a multiplier for multiplying the (n+1)th significant bit of the output of the first (n+m)-bit analog-to-digital converter by the (n+1)th significant bit of the output of said second analog-to-digital converter;

a low-pass filter for smoothing the output of said multiplier; and amplitude control means responsive to the output of said low-pass filter for controlling the amplitude of said (n+1)th significant bit from said first analog-to-digital converter to derive said cancelling signal.

3. A receiver as claimed in claim 1, wherein said feedback control circuit comprises:

first quadrature multiplier means for multiplying the (n+1)th significant bit of the output of said first (n+m)-bit analog-to-digital converter by the (n+1)th significant bit of the output of said second analog-to-digital converter in a quadrature relationship to produce I and Q outputs;

first and second low-pass filters for smoothing said I and Q outputs, respectively; and second quadrature multiplier means for multiplying the (n+1)th significant bit of the output of said first (n+m)-bit analog-to-digital converter by the outputs of said first and second low-pass filters in a quadrature relationship to derive said cancelling signal.

4. A receiver as claimed in claim 1, wherein said interference detector further comprises a band-pass filter for filtering said cancelling signal, said band-pass filter having a passband substantially equal to the bandwidth of said interfering signal.

5. A receiver as claimed in claim 1, further comprising a phase shifter for phase shifting the cancelling signal so that it coincides in phase with the interfering signal contained in the output of said demodulator.

6. A receiver as claimed in clam 2, further comprising a second low-pass filter for smoothing the (n+m)th significant bit of the output of said second analog-to-digital converter and applying the smoothed bit to said subtractor.

7. A receiver as claimed in claim 1, further comprising a transversal equalizer connected at an input terminal of said demodulator for cancelling intersymbol interference contained in said received digitally modulated signal.

8. A quadrature amplitude modulation (QAM) receiver comprising:

a QAM demodulator for demodulating a received $(2^n \times 2^n)$ QAM signal into first and second $2^n$-level demodulated signals, where n is equal to or greater than unity; and first and second data recovery circuits associated respectively with said first and second demodulated signals, wherein each of the data recovery circuits comprises:

a subtractor for cancelling an interfering signal contained in the associated demodulated signal with a cancelling signal;

a first (n+m)-bit analog-to-digital converter for resolving the amplitude of the associated demodulated signal into $2^{(n+m)}$ equal intervals and generating an (n+m)th significant bit as a replica of said interfering signal where m is equal to or greater than unity;

a second (n+m)-bit analog-to-digital converter for resolving the amplitude of an output signal from said subtractor into $2^{(n+m)}$ equal intervals and generating n higher significant bits as an output signal of each of the data recovery circuits and an (n+m)-th lower significant bit as an error signal; and a feedback control circuit for controlling the amplitude of said (n+m)th significant bit in accordance with said error signal and applying the controlled bit to said subtractor as said cancelling signal.

9. A quadrature amplitude modulation receiver as claimed in claim 8, wherein said feedback control circuit comprises:

a multiplier for multiplying the (n+1)th significant bit of the output of said first analog-to-digital converter by the (n+1)th significant bit of the output of said second analog-to-digital converter;

a low-pass filter for smoothing the output of said multiplier; and amplitude control means for controlling the amplitude of said output of said first analog-to-digital converter in response to the output of said low-pass filter.

10. A quadrature amplitude modulation receiver as claimed in claim 8, wherein said feedback control circuit comprises:

first quadrature multiplier means for multiplying the (n+1)th significant bit from said first analog-to-digital converter by the (n+1)th significant bit of the output of said second analog-to-digital converter in a quadrature relationship to produce I and Q signals;

first and second low-pass filters for smoothing said I and Q signals, respectively; and second quadrature multiplier means for multiplying the (n+1)th significant bit of the output of said first (n+m)-bit analog-to-digital converter by the outputs of said first and second low-pass filters in a quadrature relationship to derive said cancelling signal.

11. A quadrature amplitude modulation receiver as claimed in claim 8, further comprising a variable gain amplifier for amplifying said received $(2^n \times 2^n)$ QAM signal in response to a gain control signal and supplying the amplitude controlled QAM signal to said QAM demodulator, and an amplifier control means for deriving said gain control signal from the most and (n+m)th significant bits of the output of said subtractor.

12. A quadrature amplitude modulation receiver as claimed in claim 8, wherein said interference detector further comprises a band-pass filter for filtering said cancelling signal, said band-pass filter having a passband substantially equal to the bandwidth of said interfering signal.

13. A quadrature amplitude modulation receiver as claimed in claim 8, further comprising a phase shifter for phase shifting the cancelling signal so that it coincides in phase with the interfering signal contained in the associated demodulated signal.

14. A quadrature amplitude modulation receiver as claimed in claim 8, wherein each of said data recovery means further comprises a second low-pass filter for smoothing the (n+m)th significant bit of the output of said second analog-to-digital converter and applying the smoothed bit to said subtractor.

15. A quadrature amplitude modulation receiver comprising:
- a QAM demodulator means for demodulating a received ($2^n \times 2^n$) QAM signal and generating first and second $2^n$-level demodulated signals, where n is equal to or greater than unity;
- first and second (n+m)-bit analog-to-digital converters for respectively converting said first and second demodulated signals, where m is equal to or greater than unity;
- an intersymbol interference canceller having a plurality of digital transversal filters and digital correlators for detecting auto-correlation between signals on same channels from the outputs of said first and second analog-to-digital converters and cross-correlation between signals on different channels from the outputs of said first and second analog-to-digital converters for respectively controlling said transversal filters for cancelling intersymbol interference components present in the outputs of said first and second analog-to-digital converters; and
- a pair of data recovery circuits associated respectively with the outputs of said intersymbol interference canceller, each of the data recovery circuits comprising:
  - an (n+m)-bit subtractor for subtracting a cancelling signal from (n+1)th to (n+m)th significant bits of the associated output of said intersymbol interference canceller, the most to n-th significant bits of the output of the subtractor representing the received signal;
  - a correlator for detecting a correlation between the (n+1)th to (n+m)th significant bits of the output of said subtractor and the (n+1)th to (n+l)th significant bits of the associated output of the canceller; and
  - a multiplier for multiplying the (n+1)th to (n+l)th significant bits of said associated output of the canceller and the output of said correlator and applying the multiplied bits to said subtractor as said cancelling signal.

16. A quadrature amplitude modulation receiver as claimed in claim 15, further comprising:
- a band-pass filter having a passband substantially equal to the bandwidth of said interfering signal for passing therethrough the (n+1)th significant bit of the associated output of said intersymbol interference canceller; and
- a third analog-to-digital converter for converting the output of said band-pass filter into (n+1)th to (n+l)th significant bits, where l is equal to or greater than unity, and applying the last-mentioned bits to said correlator and said multiplier.

17. A quadrature amplitude modulation receiver as claimed in claim 15, further comprising a digital-to-analog converter for converting the (n+1)th to (n+m)th significant bits of the output of the associated output of the canceller into an analog signal and applying the analog signal to said band-pass filter.

18. A quadrature amplitude modulation receiver as claimed in claim 15, further comprising:
- a second QAM demodulator for receiving a ($2^n \times 2^n$) QAM signal on a polarization plane orthogonal to a polarization plane on which the signal demodulated by the first-mentioned QAM demodulator is transmitted, said second QAM demodulator providing third and fourth $2^n$-level demodulated signals;
- third and fourth (n+m)-bit analog-to-digital converters for respectively converting said third and fourth demodulated signals;
- a second intersymbol interference canceller having a plurality of digital transversal filters and digital correlators for detecting auto-correlation between signals on same channels from the outputs of said third and fourth analog-to-digital converter means and cross-correlation between signals on different channels from the outputs of said third and fourth analog-to-digital converter means for respectively controlling the last-mentioned transversal filters for cancelling intersymbol interference components present in the outputs of said third and fourth analog-to-digital converter means;
- third and fourth data recovery circuits associated respectively with the outputs of said second intersymbol interference canceller, each of the third and fourth data recovery circuits being identical to each of said first and second data recovery circuits; and
- a cross polarization interference canceller having a plurality of digital transversal filters and a plurality of correlators for detecting cross-correlation between channels from the outputs of said first intersymbol interference canceller and channels from the outputs of said second intersymbol interference canceller and respectively controlling the last-mentioned digital transversal filters for cancelling components introduced to the outputs of said first and second intersymbol interference cancellers as a result of interference between said orthogonal polarization planes.

19. A quadrature amplitude modulation receiver as claimed in claim 18, wherein said cross polarization interference canceller is connected in series circuit configuration with said first and second intersymbol interference cancellers for cancelling the cross polarization interference components contained in the outputs of said first and second intersymbol interference cancellers.

20. A quadrature amplitude modulation receiver as claimed in claim 18, wherein said cross polarization interference canceller is connected in parallel circuit configuration with said first and second intersymbol interference cancellers for cancelling the cross polarization interference components contained in the inputs and outputs of said first and second intersymbol interference cancellers.

21. A receiver for a digital modulation system, comprising:
- a demodulator for demodulating a received digitally modulated signal to produce a $2^n$-level signal;
- an (n+m)-bit analog-to-digital converter for resolving the amplitude of said $2^n$-level signal into $2^{(n+m)}$ equal intervals and generating an output signal of $(n+m)$ bits, where m is equal to or greater than unity;

a $(n+m)$-bit digital subtractor for cancelling an interfering signal contained in said $2^n$-level signal with a cancelling signal;

a correlator for detecting a correlation between the $(n+1)$th to $(n+m)$th significant bits of the output of said digital subtractor and the $(n+1)$th to $(n+m)$th significant bits of the output of said analog-to-digital converter; and a multiplier for multiplying the $(n+1)$th to $(n+m)$th significant bits of the output of said analog-to-digital converter by an output signal from said correlator and applying the multiplied bits to said digital subtractor as said cancelling signal.

22. A receiver as claimed in claim 21, further comprising:

a digital-to-analog converter for converting the $(n+1)$th to $(n+m)$th significant bits of the output of said analog-to-digital converter into a corresponding analog signal;

a band-pass filter tuned to the frequency of said interfering signal for filtering said analog signal; and a second analog-to-digital converter for converting the filtered analog signal into a digital signal and applying the digital signal to said correlator.

23. A quadrature amplitude modulation (QAM) receiver comprising:

a QAM demodulator for demodulating a received $(2^n \times 2^n)$ QAM signal into first and second $2^n$-level demodulated signals, where n is equal to or greater than unity; and first and second data recovery circuits associated respectively with said first and second demodulated signals, wherein each of the data recovery circuits comprises:

an $(n+m)$-bit analog-to-digital converter for resolving the amplitude of the associated $2^n$-level signal into $2^{(n+m)}$ equal intervals and generating an output signal of $(n+m)$ bits, where m is equal to or greater than unity;

a $(n+m)$-bit digital subtractor for cancelling an interfering signal contained in said one of said $2^n$-level signals with a cancelling signal;

a correlator for detecting a correlation between the $(n+1)$th to $(n+m)$th significant bits of the output of said analog-to-digital converter; and a multiplier for multiplying the $(n\ 30\ 1)$th to $(n+m)$th significant bits of the output of said analog-to-digital converter by an output signal from said correlator and applying the multiplied bits to said digital subtractor as said cancelling signal.

24. A quadrature amplitude modulation (QAM) receiver as claimed in claim 23, further comprising:

a digital-to-analog converter for converting the $(n\ 30\ 1)$th to $(n+m)$th significant bits of the output of said analog-to-digital converter into a corresponding analog signal;

a band-pass filter tuned to the frequency of said interfering signal for filtering said analog signal; and a second analog-to-digital converter for converting the filtered analog signal into a digital signal and applying the digital signal to said correlator.

* * * * *

UNITED STATES PATENT AND TRADEMARK OFFICE
CERTIFICATE OF CORRECTION

PATENT NO. : 4,823,361

DATED : April 18, 1989

INVENTOR(S) : Yasuharu YOSHIDA

It is certified that error appears in the above-identified patent and that said Letters Patent is hereby corrected as shown below:

COLUMN 4, LINE 59    After "when" insert --the input is--.

COLUMN 11, LINE 6    Delete "modulator" and insert --as a demodulator--.

COLUMN 13, LINE 45   Delete the second occurrence of "(n+1)th" and insert --(n+$\ell$)th--.

COLUMN 13, LINE 48   Delete the second occurrence of "(n+1)th" and insert --(n+$\ell$)th--.

COLUMN 13, LINE 62   Delete "(n+1)th" and insert --(n+$\ell$)th--.

COLUMN 13, LINE 62   Delete "where 1" and insert --where $\ell$--.

COLUMN 16, LINE 16   Delete "(n 301)th" and insert --(n+1)th--.

COLUMN 16, LINES 23 AND 24, Delete "(n 301)th" and insert --(n+1)th--.

Signed and Sealed this

Twenty-third Day of January, 1990

Attest:

JEFFREY M. SAMUELS

*Attesting Officer*    *Acting Commissioner of Patents and Trademarks*